US009934050B2

(12) United States Patent
Shih (10) Patent No.: US 9,934,050 B2
(45) Date of Patent: Apr. 3, 2018

(54) SYSTEM AND METHOD FOR NETWORK-BASED ISCSI BOOT PARAMETER DEPLOYMENT

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/849,059

(22) Filed: Sep. 9, 2015

(65) Prior Publication Data

US 2016/0179555 A1    Jun. 23, 2016

Related U.S. Application Data

(60) Provisional application No. 62/093,297, filed on Dec. 17, 2014.

(51) Int. Cl.

| G06F 15/177 | (2006.01) |
|---|---|
| G06F 9/24 | (2006.01) |
| G06F 13/00 | (2006.01) |
| G06F 9/44 | (2018.01) |
| H04L 29/08 | (2006.01) |
| H04L 12/24 | (2006.01) |
| H04L 29/12 | (2006.01) |
| G06F 9/445 | (2018.01) |

(52) U.S. Cl.
CPC .......... *G06F 9/4416* (2013.01); *G06F 9/4406* (2013.01); *H04L 41/0806* (2013.01); *H04L 67/34* (2013.01); *G06F 9/44505* (2013.01); *H04L 61/2015* (2013.01); *H04L 67/1097* (2013.01)

(58) Field of Classification Search
CPC ..................................................... G06F 9/4401
USPC ............................................................. 713/2
See application file for complete search history.

(56) References Cited

U.S. PATENT DOCUMENTS

| 6,356,965 B1 * | 3/2002 | Broyles | G06F 9/4416 709/220 |
|---|---|---|---|
| 7,051,087 B1 * | 5/2006 | Bahl | H04L 29/1232 709/220 |
| 7,127,602 B1 * | 10/2006 | Bakke | G06F 9/4416 709/222 |

(Continued)

FOREIGN PATENT DOCUMENTS

| CN | 101331734 A | 12/2008 |
|---|---|---|
| CN | 101714092 A | 5/2010 |

OTHER PUBLICATIONS

Taiwanese Office Action for Application No. 104136048, dated Nov. 29, 2016 w/ English First Action Summary.

*Primary Examiner* — Suresh Suryawanshi
(74) *Attorney, Agent, or Firm* — Nixon Peabody LLP; Eduardo J. Quinones; Zhou Lu (57) ABSTRACT

This disclosure generally relate to remote booting of a computing system. The present technology relates techniques that can enable deploying boot parameters to one or more booting servers in a scalable and autonomous approach. A service controller can receive and transmit a boot sequence and/or boot configuration to other computing components, such as a BIOS or a host bus adapter. The service controller can transmit boot information by a system interface called a keyboard controller style interface.

20 Claims, 6 Drawing Sheets

(56) References Cited

U.S. PATENT DOCUMENTS

| | | | | |
|---|---|---|---|---|
| 7,203,735 | B1* | 4/2007 | Le Pennec | G06F 17/30194 707/999.01 |
| 7,730,221 | B2* | 6/2010 | Diamant | G06F 9/4416 710/1 |
| 7,734,818 | B2* | 6/2010 | Hernandez | G06F 9/445 370/254 |
| 7,747,847 | B2* | 6/2010 | El Zur | G06F 9/4416 709/222 |
| 7,882,562 | B2* | 2/2011 | Arroyo | H04L 63/08 726/26 |
| 7,886,139 | B2* | 2/2011 | Hernandez | G06F 9/4416 370/254 |
| 8,069,345 | B2* | 11/2011 | Odell | G06F 9/4416 713/2 |
| 8,117,432 | B2* | 2/2012 | Chen | G06F 9/4416 713/2 |
| 8,239,665 | B2* | 8/2012 | Liu | H04L 41/0803 713/1 |
| 8,245,022 | B2* | 8/2012 | Mittapalli | G06F 9/4416 713/2 |
| 8,380,971 | B2* | 2/2013 | Cherian | G06F 9/4401 713/2 |
| 8,560,821 | B2* | 10/2013 | Lerner | G06F 9/4416 709/217 |
| 8,806,186 | B2* | 8/2014 | Tsirkin | G06F 9/4408 713/1 |
| 9,164,773 | B2* | 10/2015 | Chaganti | G06F 17/30194 |
| 2007/0143611 | A1* | 6/2007 | Arroyo | H04L 63/0428 713/171 |
| 2015/0143094 | A1* | 5/2015 | Rose | G06F 9/4416 713/2 |
| 2017/0201419 | A1* | 7/2017 | Garcia | H04L 41/0806 |

\* cited by examiner

SYSTEM AND METHOD FOR NETWORK-BASED ISCSI BOOT PARAMETER DEPLOYMENT

This application claims priority to U.S. Provisional Application No. 62/093,297, filed Dec. 17, 2014, and entitled "Setup iSCSI Boot Configuration from BMC", the contents of which are hereby incorporated by reference in its entirety for all purposes.

FIELD OF THE INVENTION

The disclosure relates generally to remote booting of a computing system. More specifically, certain embodiments of the technology relate to a method and system for deploying remote boot parameters.

BACKGROUND

Storage Area Networks (SANs) provide an important data storage solution for modern data centers. SANs are primarily used to enhance storage devices accessibility to servers so that the devices appear like locally attached devices to the operating system. Examples of the storage devices include Redundant Array of Independent Disks (RAID) and disk arrays such as SAN arrays. By providing block-level storage that can be accessed by any networked servers, SANs provide a consolidated data storage while offering increased system performance.

SANs also offer excellent capacities for data backup and disaster recovery. Because data can be transferred between storage devices without interacting with a server, a SAN can accelerate the data backup process and conserve the processing power of the server Central Processing Unit (CPU).

Among various protocols that enable SANs, Internet Small Computer System Interface (iSCSI) is a popular technology. ISCSI can enable location-independent data storage over local area networks (LANs), wide area networks (WANs), or the Internet.

SUMMARY

Aspects of the present technology relate to techniques that enable an efficient deployment of boot parameters using a network interface, which can provide scalable and efficient management for SANs.

In an example of a first embodiment, a method is performed by a service controller. The method can include receiving, at a service controller associated with a remote computing device, a basic input/output system (BIOS) boot order of the remote computing device, transmitting the BIOS boot order to a BIOS associated with the remote computing device, receiving (via a network interface) remote boot configuration at the service controller, configuring a remote boot network adapter with the remote boot configuration and establishing (via the remote boot network adapter) a network connection between a data storage device and the remote computing device. The data storage device can include an operation system image operable to boot the remote computing device.

According to some embodiments, a remote server or an iSCSI client device may establish an iSCSI connection with a remote storage device or an iSCSI target device that can include an operation system image. The operation system image can be remotely booted from the remote server or the iSCSI client device. Advantageously, by utilizing the remote iSCSI boot from a remote storage device, the number of local hard drives utilized by the remote servers can be significantly reduced. The resulting storage consolidation may reduce server costs and facilitate server management.

According to some embodiments, the present technology can enable a network-based deployment of boot parameters using a network interface to implement the remote iSCSI boot. The network-based deployment of boot parameters can further improve server scalability and flexibility as servers can be managed over a network at a centralized location, e.g., by a server management device. For example, using the network-based deployment of boot parameters, the administrator does not need to physically connect to each server for manually configuring the servers. Consequently, the network-based deployment of boot parameters can simplify data center designs and reduce server form factors.

According to some embodiments, the present technology can use system management software (SMS) to enable a service controller (e.g., a Baseboard Management Controller (BMC)) to implement the network-based iSCSI boot parameter deployment. The present technology can enable a Rack Management Controller (RMC), a Chassis Management Controller (CMC) to provide a centralized boot parameter deployment. Additionally, other suitable protocols that are well known by those skilled in the art e.g., Red Fish or RMCP+, can also be utilized to realize the present technology.

According to some embodiments, a server management device such as a computer can statically configure a booting server to boot from an iSCSI storage device. For example, a server management device can connect to a service controller of a booting server or a client device via LAN. The server management device can determine remote boot parameters and transmit them to the service controller or a remote boot network adapter.

According to some embodiments, the iSCSI boot configuration can be any booting path parameters such as an iSCSI initiator/client name, an Internet Protocol (IP) address of an initiator or a client device, an iSCSI target name, an IP address of a target device, a LUN of a target device. Additionally, the iSCSI boot configuration can further include security parameters such as password, encryption information, or Challenge-Handshake Authentication Protocol (CHAP) information.

After receiving the remote boot parameters, the booting server can establish an iSCSI communication to the designated iSCSI storage device using a Transmission Control Protocol/Internet Protocol (TCP/IP) interface. Consequently, the booting server can remotely boot from the iSCSI storage device as if it is locally attached to the server. A Host Bus Adapter (HBA) can continuously redirect disk access requests to the target device over the iSCSI connection.

According to some embodiments, the system can include a Dynamic Host Configuration Protocol (DHCP) server to dynamically determine the iSCSI boot parameters. A DHCP Server can receive requests from a booting server or a client device for boot parameters via a LAN. In response, the DHCP server can dynamically determine iSCSI boot parameters for establishing an iSCSI connection between the iSCSI client device and the iSCSI target device.

Although many of the examples herein are described with reference to the iSCSI protocol, it should be understood that these are only examples and the present technology is not limited in this regard. Rather, any protocols that provide communication connections for SANs may be used, such as Fibre Channel protocol, ATA over Ethernet, or the like.

Additionally, even though the present discussion uses a RMC and a BMC as examples of a service controller, the present technology is applicable to other service controller that is independent from the main CPU and operation system.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

Storage Area Networks enable multiple host servers to access a shared pool of remote storage resources such as disk arrays in a fibre channel network or a LAN. The economic consolidation of disk arrays simplifies storage administration and improves storage flexibility.

Storage Area Networks also provide an interface to allow remote booting servers to boot from a storage disk that contains an operation system (OS) image using protocols a network interface such as, an internet small computer system interface or iSCSI. Advantages of the remote booting include an easy replacement of failed servers. For example, an administrator can remotely substitute a failed server with a functional server to access a storage device of the failed server. Similarly, by utilizing the remote iSCSI boot from a remote storage device, the number of local hard drives required by the booting servers can be significantly reduced, thus resulting in storage consolidation.

ISCSI is a popular protocol that enables server access to SAN storage devices as well as other devices. It transmits small computer system interface commands over the TCP/IP protocol. Unlike the fibre channel network that requires a fibre channel infrastructure for SAN network traffic, ISCSI enables servers to access storage devices using TCP over standard LAN infrastructures.

However, configuring iSCSI boot parameters for a large number of servers can be time consuming and challenging. For example, an administrator is often required to physically connect to each booting server for configuration. Such a manual configuration process creates a hurdle for efficient SAN management in large-scale data centers.

Thus, there is a need to improve the remote booting protocol by providing an automatic mechanism that can configure a large number of networked servers.

The present technology discloses techniques that can enable deploying boot parameters to one or more booting servers in a scalable and autonomous approach. According to some embodiments, a service controller can receive a boot sequence and/or boot configuration from a SMS by a suitable network interface, e.g., RMCP+ or Redfish. The service controller can then transmit the received boot configuration to other computing components, such as BIOS parameters by IPMI over KCS, NIC option ROM by $I_2C$ or bridged by BIOS. According to some embodiments, the service controller can transmit boot information by any suitable mechanisms.

For example, iSCSI boot configuration can be stored in BIOS or an Option ROM of a NIC (Network Interface Controller) card. For example, a Unified Extensible Firmware Interface (UEFI) BIOS can store booting parameter in BIOS. As for its communication mechanism, BIOS can query iSCSI boot configurations from a BMC during the system boot phase and then write it to the BIOS parameters.

Alternatively, a legacy BIOS can store configuration in a NIC card. According to some embodiments, a legacy BIOS can query iSCSI boot configurations from a BMC and update parameter to a NIC card by a suitable interface. According to some embodiments, a BMC can directly write iSCSI boot configuration to a NIC card via $I^2C$.

Figure 1:
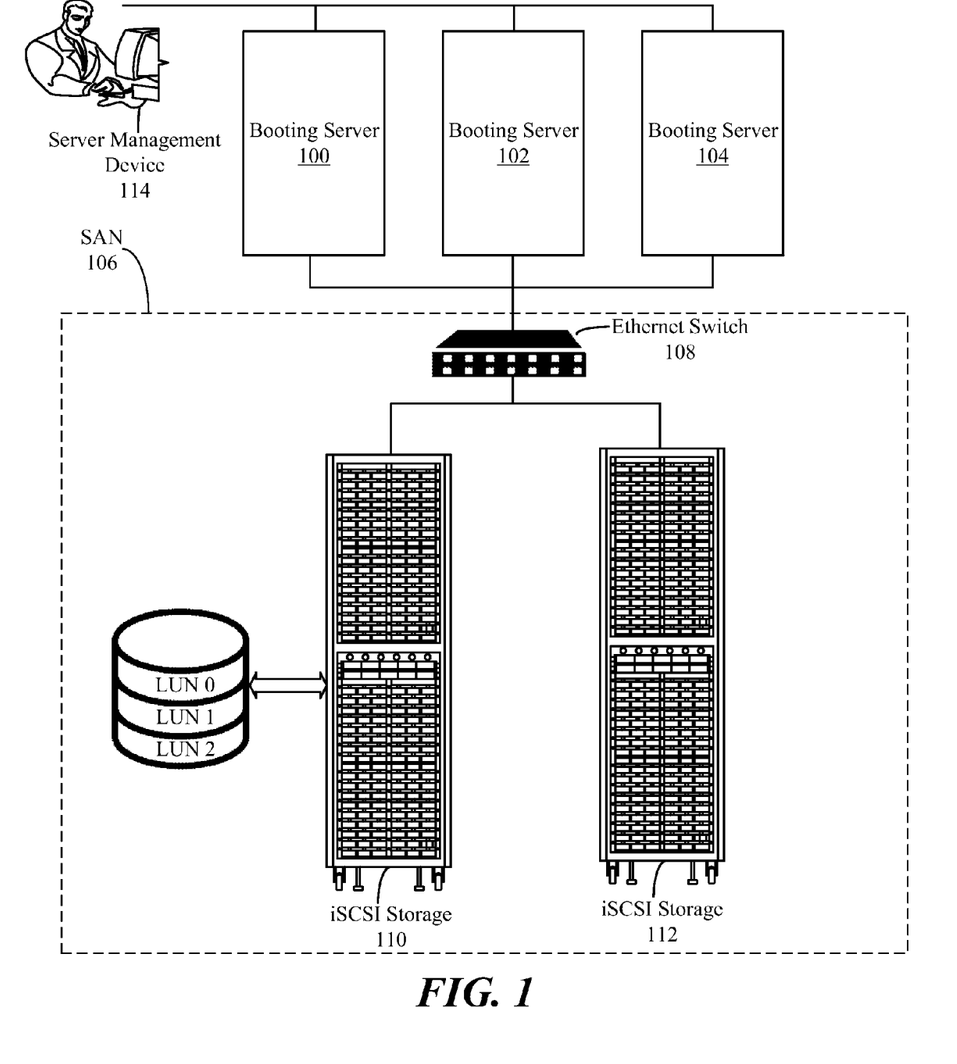
FIG. 1 illustrates an overall iSCSI boot parameter deployment system diagram, according to some embodiments.

FIG. 1 illustrates an overall iSCSI boot parameter deployment system diagram, according to some embodiments. It should be appreciated that the system topology in FIG. 1 is an example, and any numbers of computing devices such as servers, storage devices, controllers, switches and network components may be included in the system of FIG. 1.

According to some embodiments, an iSCSI boot parameter deployment system can include a Server Management Device 114 that is connected to a number of Servers such as booting servers 100, 102 and 104 via a network. According to some embodiments, Server Management Device 114 can be a personal computer, a tablet, a laptop computer, or the like. A network can be a LAN, a wide area network (WAN), an Internet, or a combination thereof.

According to some embodiments, booting servers 100, 102 and 104 can be connected to a SAN 106. As the booting servers do not include a storage device for storing an operation system image, booting servers 100, 102 and 104 need to boot from a storage device that includes an operation system image. For example, an operation system image can include system files such as Windows or Linux files for booting up a computer. Examples of such storage devices can be iSCSI storage 110 and 112, or other storage devices that support remote booting with alternative protocols. Additionally, a storage device can include volatile storage or memory and/or persistent storages, e.g., hard disk drive, flash memory or other type of read only memory (ROM), and the like.

As shown in FIG. 1, SAN 106 can include, for example, an Ethernet switch 108 for implementing a network interface. SAN 106 can further include iSCSI storage 110 and 112. According to some embodiments, Ethernet switch 108 can be a switch that is dedicated to iSCSI network traffic. According to some embodiments, Ethernet switch 108 can be a switch that is shared with regular LAN data transmission.

According to some embodiments, iSCSI storage 110 can, for example, include a logical unit number (LUN) to identify a logical unit of the storage device. As shown in FIG. 1, iSCSI Storage 110 can include LUN 0, LUN 1, LUN 2 and LUN 3, each of which is a respective logical unit that can include an OS image for booting up a booting server remotely. According to some embodiments, iSCSI storage 110 can use other identifiers such as SCSI device IDs to uniquely identify each respective storage unit.

As the iSCSI protocol adopts a client-target architecture, a booting servers or a client device can initiate the iSCSI communication between a target device or a iSCSI storage device. Further, the client device can include an iSCSI initiator (not shown) operable to initiate communication with the target device. According to some embodiments, when a client device boots to the iSCSI target through the iSCSI initiator, an operation system loader from the iSCSI target will be loaded into a memory of the client device. Then the operation system loader will access the remaining Operation System from the iSCSI target.

As shown in FIG. 1, a server management device 114 can configure a specific booting server to boot from a selected iSCSI storage device. For example, server management device 114 can be connected to booting server 100, 102 and 104 via a LAN. An administrator, by server management device 114, can set a BIOS boot sequence to booting server 100. The BIOS boot sequence can specify from which target device the client device shall be booted. According to some embodiments, the administrator can further assign iSCSI boot configuration to booting server 100. For example, a HBA of booting server 100 (not shown) can receive and manage the iSCSI boot configuration. The iSCSI boot configuration can be any booting path parameters such as an iSCSI initiator name, an internet protocol (IP) address of an initiator, an iSCSI target name, an IP address of a target device, or a LUN of a target device. Additionally, the iSCSI boot configuration can further include security parameters such as password, encryption information, or challenge-handshake authentication protocol (CHAP) information.

After receiving the iSCSI boot order and boot configuration, booting server 100 can establish an iSCSI communication to a designated iSCSI storage device, e.g., iSCSI storage 110, via a TCP/IP network implemented by Ethernet switch 108. Consequently, booting server 100 can remotely boot from a designated storage device, e.g., iSCSI storage 110, as if the storage device is locally attached to the server.

Following the boot, booting server 100 can, via the established iSCSI connection, access the boot volume that can include applications and data, e.g. LUN0 of iSCSI storage 110. booting server 100 can also access other volumes via iSCSI, much similar to a traditional computing system may access more than one directly attached SCSI device. As such, booting server 100 can access applications and other data from volumes other than the boot volume.

According to some embodiments, the system can include a dynamic host configuration protocol (DHCP) server (not shown) to dynamically determine the iSCSI boot parameters.

Figure 2:
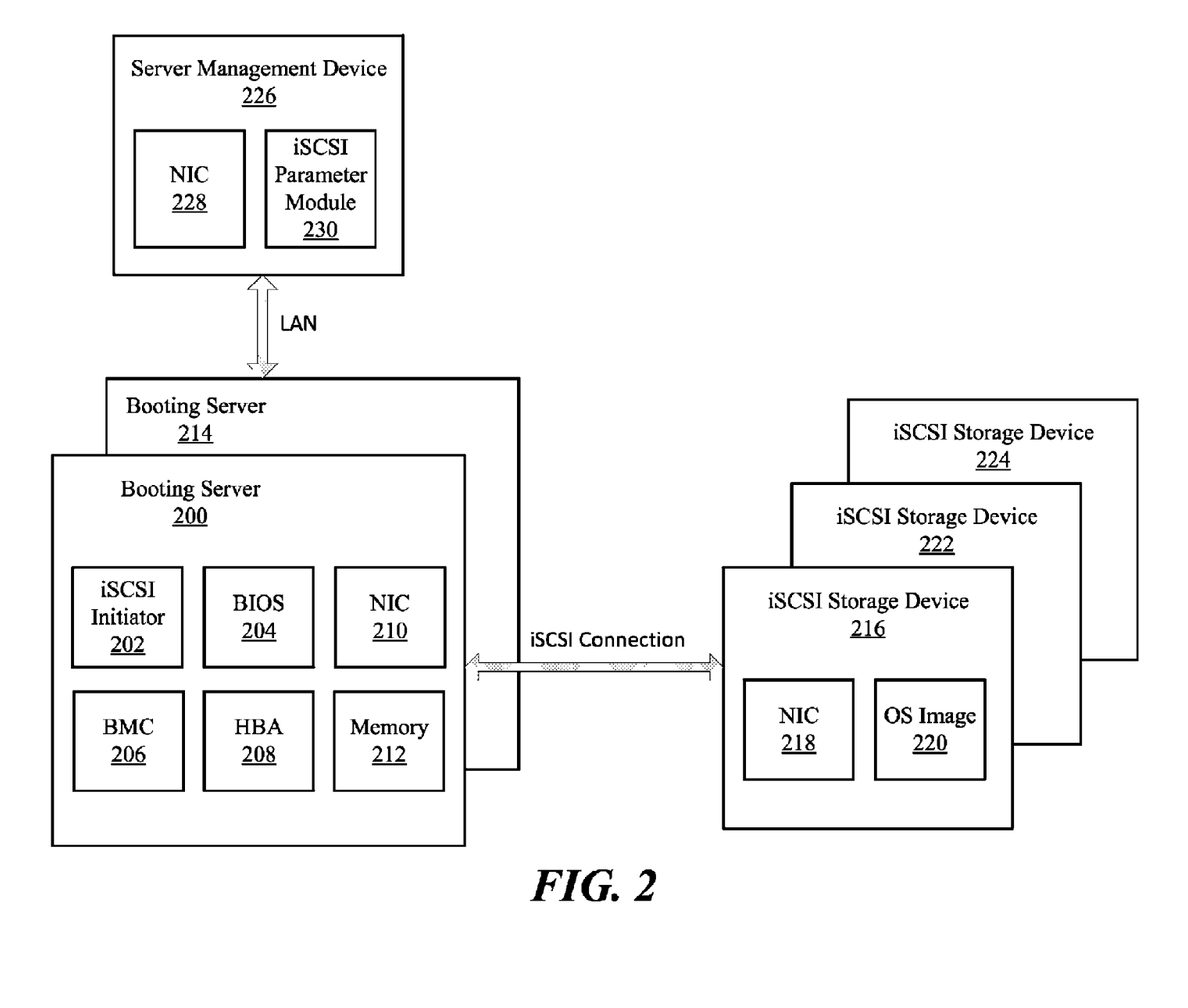
FIG. 2 is a schematic block diagram illustrating an example of an iSCSI boot parameter deployment system with static configuration assignment, according to some embodiments.

FIG. 2 is a schematic block diagram illustrating an example of an iSCSI boot parameter deployment system with static configuration assignment, according to some embodiments. As shown in FIG. 2, an iSCSI boot parameter deployment system can include, for example, a Server Management Device 226 that can manage remote booting for a number of booting servers, e.g., booting server 200 and 214. The iSCSI boot parameter deployment system can further include a SAN. The SAN can include a number of iSCSI storage devices, e.g., iSCSI storage device 216, 222 and 224. Each of the iSCSI storage devices is operable to communicate with a host computer via an Ethernet switch (not shown). The Ethernet Switch can be a switch dedicated to iSCSI data transmission, or a switch that is shared with general network data transmission. According to some embodiments, booting server 200 is an iSCSI client device that can remotely boot form an iSCSI target device such as iSCSI storage device 216 using the iSCSI protocol.

According to some embodiments, server management device 226 can be a personal computer, a tablet, a laptop computer, or the like. It can, for example, include a network interface controller (NIC) 228 for implementing a network with booting server 200. A typical network can be a LAN, a wide area network (WAN), an Internet, or a combination thereof.

As illustrated in FIG. 2, booting server 200 can include, for example, an iSCSI Initiator 202, a BIOS or CPU 204, a NIC 210, a BMC 206, a HBA 208 and a Memory 212. According to some embodiments, a BMC is an independent and embedded microcontroller that, in some embodiments, is responsible for the management and monitoring of the main CPU, firmware and operating system. According to some embodiments, BMC 206 can include, for example, a BMC processor (not shown) and a Read-only memory ROM (not shown). According to some embodiments, a BMC can monitor the server's hardware components by receiving data from sensors installed in the chassis, e.g., fan speeds, CPU temperature, power consumption level, etc. Additionally, a BMC can, for example, transmit boot information by IPMI over KCS.

A host bus adapter (HBA) can connect a host system (e.g., a computer) to other network and storage devices. For example, a host bus adapter can connect iSCSI, Fibre Channel devices to a computer. A host bus adapter can facilitate configuration of the host adapter itself. According to some embodiments, a device driver (e.g. an initiator) that is linked to the operating system can control the host adapter itself. According to some embodiments, HBA 208 can include, for example, a converged network interface card (CNIC) processor (not shown) and a Read-only memory (ROM (not shown).

According to some embodiments, an administrator can manage boot information using iSCSI parameter module 230. ISCSI parameter module 230 can assign, save and transmit boot parameters for the remote booting process.

An administrator can assign boot parameters to BMC 206 via LAN, which can be implemented between NIC 228 and NIC 210. According to some embodiments, boot parameters can include a BIOS boot order, iSCSI boot configuration, or any other information related to an iSCSI remote boot. The BIOS boot order can specify from which target device the client device shall be booted. ISCSI boot configuration can include, for example, an iSCSI initiator/target name, an IP address of an iSCSI initiator/target, a logical unit number (LUN) or an identifier of an iSCSI target device, encryption parameters of a target device, or any other booting information that can establish a booting path using the iSCSI protocol. According to some embodiments, the iSCSI boot configuration can further include security parameters such as password, encryption information, or challenge-handshake authentication protocol (CHAP) information.

According to some embodiments, BMC 206 can transmit the BIOS boot order to BIOS 204, which can accordingly change the boot order of booting server 200. BIOS 204 can be typical build-in codes for initial boot functions of the computer system. BIOS 204 can enable booting server 200 to receive input from peripheral devices such as a key board. BIOS 204 can provide the control of disk drives such as an iSCSI target device 216. For example, the BIOS boot order can specify BIOS 204 to boot from a specific target device such as iSCSI Storage Device 216. According to some embodiments, the BIOS boot order can configure HBA 208 to specify the target device from which Booting server 200 shall boot.

According to some embodiments, BMC 206 can transmit, as explained earlier, the received iSCSI boot configuration to HBA 208. According to some embodiments, HBA 208 can save the iSCSI boot configuration to Memory 212, which can be a non-volatile memory. According to some embodiments, Memory 212 can be exclusively controlled by BMC 206; According to some embodiments, Memory 212 can be shared by BMC 206 and BIOS 204. Alternatively, BIOS 204 can transmit the iSCSI boot configuration to HBA 208.

According to some embodiments, booting server 200 can include iSCSI Initiator 202 that is operable to communicate with an iSCSI target device such as iSCSI storage device 216. ISCSI storage device 216 can include a SAN hard disk, an optical disk, a volatile storage or memory and/or persistent storages, flash memory or other type of read only memory (ROM), and the like. ISCSI storage device 216 can store operation system image 220 that is operable to remotely boot a booting server. ISCSI storage device 216 can include NIC 218 for network implementation. According to some embodiments, iSCSI Initiator 202 can use the boot order and the iSCSI boot configuration to establish an iSCSI connection between an iSCSI client device and an iSCSI target device, e.g., between booting server 200 and iSCSI storage device 216.

An iSCSI connection can be, for example, a dedicated iSCSI data transmission link over an IP network. Particularly, by encapsulating SCSI commands into transmission control protocol/internet protocol (TCP/IP) packets, the iSCSI connection can carry small computer systems interface (SCSI) commands over an IP network. It can support block-level data transmission that can be accessed by any networked device, thus providing a consolidated data storage solution.

After the iSCSI connection is established, at least a portion of an operation system can be loaded into Memory 212 of booting server 200. Next, the rest of the operation system can be consequently loaded and executed on booting server 200 as if iSCSI storage device 216 is locally attached to the booting server. For example, an operation system loader will be loaded into memory 212 of booting server 200. Then the operation system loader will access the remaining operation system from iSCSI storage device 216.

With the remote booting completed, booting server 200 can, via the established iSCSI connection, access the boot volume specified by the boot parameters. Additionally, booting server 200 can access applications and data from volumes other than the boot volume applications via iSCSI.

According to some embodiments, booting server 200 can comprise a rack management controller (RMC, not shown) for routing and managing data communications between the different nodes. A RMC can be an embedded and independent microprocessor that is designed to manage one or more chassis of booting server 200. According to some embodiments, a server management device 226 can deploy iSCSI boot parameters from a RMC interface and avoiding the distributed BMC interfaces.

Further, more than one iSCSI client device can boot from one single iSCSI target device using the iSCSI remote boot, which can provide a consolidated data storage and increased system performance. For example, with the same target device IP and LUN in its respective boot configuration, booting server 200 and booting server 214 can share the operation system image in one iSCSI storage device.

Additionally, when booting server 200 fails, an administrator can remotely substitute the failed disk with a functional server, e.g., booting server 214. The substituting booting server 214 can access data and application in iSCSI storage device.

Figure 3:
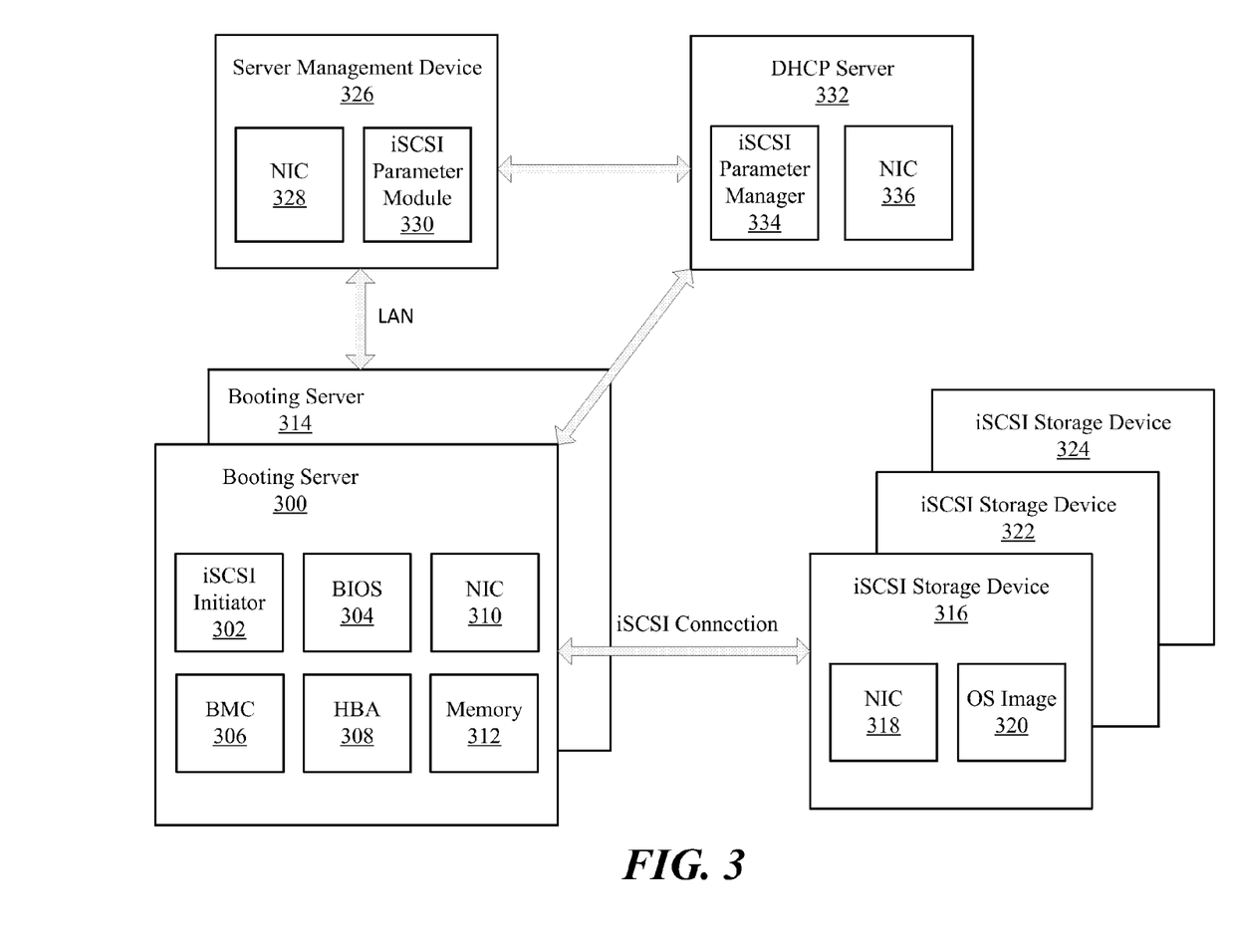
FIG. 3 is a schematic block diagram illustrating an example of an iSCSI boot parameter deployment system with dynamic configuration assignment, according to some embodiments.

FIG. 3 is a schematic block diagram illustrating an example of an iSCSI boot parameter deployment system with dynamic configuration assignment, according to some embodiments. It should be understood that there can be additional, fewer, or alternative steps performed in similar or alternative orders, or in parallel, within the scope of the various embodiments unless otherwise stated.

As shown in FIG. 3, an iSCSI boot parameter deployment system can include, for example, a dynamic host configuration protocol (DHCP) server that is operable to dynamically determine boot parameters for the iSCSI remote booting process. DHCP server 332, for example, can include iSCSI parameter manager 334 that is operable to determine, store and transmit the boot parameters. DHCP server 334 can further include a NIC 336 operable to implement a LAN with other network devices. According to some embodiments, DHCP server 332 can receive requests from booting server 300 for boot parameters via LAN. In response, DHCP server 332 can dynamically determine iSCSI boot configuration for establishing an iSCSI connection between an iSCSI client device and an iSCSI target device.

According to some embodiments, a server management device 326 that can manage remote booting for a number of client devices, e.g., booting server 300 and 314. The iSCSI boot parameter deployment system can further include a SAN. A SAN can include a number of iSCSI storage devices, e.g., iSCSI storage device 316, 322 and 324, each of which is operable to communicate with a host computer (or a client device) via an Ethernet switch (not shown). Additionally, the Ethernet switch can be a switch dedicated to iSCSI data transmission, or a switch that is shared with general network data transmission.

According to some embodiments, booting server 300 is an iSCSI client device operable to remotely boot form an iSCSI target device such as iSCSI storage device 316. According to some embodiments, server management device 326 can be a personal computer, a tablet, a laptop computer, or the like. It can, for example, include a network interface controller (NIC) 328 for implementing a network with booting server 300. A typical network can be a LAN, a wide area network (WAN), an Internet, or a combination thereof. According to some embodiments, server management device 326 can include an iSCSI parameter module 330 that can receive, save and transmit iSCSI boot information as disclosed herein.

As illustrated in FIG. 3, booting server 300 can include, for example, an iSCSI initiator 302, a BIOS or CPU 304, a NIC 310, a BMC 306, a HBA 308 and a Memory 312. According to some embodiments, a BMC is an independent and embedded microcontroller that, in some embodiments, is responsible for the management and monitoring of the main CPU, firmware and operating system. According to some embodiments, BMC 306 can include, for example, a BMC processor (not shown) and a Read-only memory ROM (not shown). According to some embodiments, a BMC can, for example, transmit boot information by any suitable mechanisms. For example, iSCSI boot configuration can be stored in BIOS or an Option ROM of a (Network Interface Controller) NIC card. For example, a Unified Extensible Firmware Interface (UEFI) BIOS can store booting parameter in BIOS. BIOS can query iSCSI boot configurations from a BMC during the system boot phase and then write it to the BIOS parameters.

Alternatively, a legacy BIOS can store configuration in a NIC card. According to some embodiments, a legacy BIOS can query iSCSI boot configurations from a BMC and update parameter to a NIC card by a suitable interface. According to some embodiments, a BMC can directly write iSCSI boot configuration to a NIC card via I²C.

A host bus adapter can connect a host system (e.g., a computer) to other network and storage devices. For example, a host bus adapter can connect iSCSI, fibre channel devices to a computer. Additionally, a host bus adapter can facilitate configuration of the host adapter itself. According to some embodiments, a device driver (e.g. an initiator) that is linked to the operating system can control the host adapter itself. According to some embodiments, HBA 308 can include, for example, a converged network interface card (CNIC) processor (not shown) and a read-only memory (ROM (not shown).

According to some embodiments, BMC 306 can provide a MAC address of HBA 308 to DHCP Server 332. DHCP server 332 can be operable to assign boot configuration (e.g. iSCSI initiator name, iSCSI initiator IP address) for HBA 308 based on the MAC address. According to some embodiments, server management device 326 can receive the MAC address from BMC 308 and transmit it to DHCP server 332 via a LAN that is implemented between NIC 310 and NIC 336. Server management device 326 can also receive the boot configuration from DHCP server 332. According to some embodiments, the received boot configuration can be stored in memory 312. Further, server management device 326 can transmit the boot configuration to HBA 308.

According to some embodiments, server management device 326 can also receive the boot configuration from DHCP server 332 and transmit it to BIOS 304. BIOS 304 can be typical build-in codes for initial boot functions of the computer system. BIOS 304 can enable booting server 300 to receive input from peripheral devices such as a key board, and to provide the control of disk drives such as an iSCSI storage device 316. Accordingly, the BIOS boot order can specify BIOS 304 to boot from a specific target device such as iSCSI storage device 316. According to some embodiments, the BIOS boot order can configure HBA 308 to specify the target device from which booting server 300 shall boot.

According to some embodiments, the boot configuration can be any booting path parameters such as an iSCSI initiator/client name, an internet protocol (IP) address of an initiator or a client device, an iSCSI target name, an IP address of a target device, a LUN of a target device. Additionally, the iSCSI boot configuration can further include security parameters such as password, encryption information, or challenge-handshake authentication protocol (CHAP) information.

According to some embodiments, BMC 306 can receive a boot order, for example, from an administrator using server management device 326. According to some embodiments, According to some embodiments, BMC 306 can transmit the BIOS boot order to BIOS 304, which can accordingly adjust the boot order of booting server 300.

According to some embodiments, BMC 306 can transmit iSCSI boot configuration to HBA 308. According to some embodiments, HBA 308 can save the iSCSI boot configuration to memory 312, which can be a non-volatile memory. According to some embodiments, memory 312 can be exclusively controlled by BMC 306; According to some embodiments, memory 312 can be shared by BMC 306 and BIOS 304. Alternatively, BIOS 304 can transmit the iSCSI boot configuration to HBA 308.

According to some embodiments, booting server 300 can include iSCSI Initiator 302 operable to communicate with an iSCSI target device such as iSCSI storage device 316. ISCSI storage device 316 can include a SAN hard disk, an optical disk, a volatile storage or memory and/or persistent storages, flash memory or other type of read only memory (ROM), and the like. ISCSI storage device 316 can store OS image 320 that is operable to remotely boot a booting server. ISCSI storage device 316 can include NIC 318 for network implementation. According to some embodiments, iSCSI initiator 302 can use the boot order and the iSCSI boot configuration to establish an iSCSI connection between an iSCSI client device and an iSCSI target device, e.g., between booting server 300 and iSCSI storage device 316.

An iSCSI connection can be, for example, a dedicated iSCSI data transmission link over an IP network. By encapsulating SCSI commands into transmission control protocol/internet protocol (TCP/IP) packets, the iSCSI connection can carry small computer systems interface (SCSI) commands over an IP network. It also support block data transmission using the IP network.

After the iSCSI connection is established, at least a portion of an operation system can be loaded into memory 312 of booting server 300. Next, the rest of the operation system can be accordingly loaded and executed on booting server 300 as if iSCSI storage device 316 is locally attached to the booting server.

With the remote booting completed, booting server 300 can, via the established iSCSI connection, access the boot volume specified by the boot parameter. Additionally, booting server 300 can access applications and data from volumes other than the boot volume applications via iSCSI.

Further, more than one iSCSI client device can boot from one single iSCSI target device, which can provide a consolidated data storage and increased system performance. For example, booting server 300 and booting server 314 can share the OS image in one iSCSI storage device. Additionally, when booting server 300 fails, an administrator can remotely substitute the failed disk with a functional server, e.g., booting server 314. Accordingly, the substituting booting server 314 can access data and application in the same iSCSI storage device.

According to some embodiments, booting server 300 can comprise a rack management controller (RMC, not shown) for routing and managing data communications between the different nodes. A rack management controller can be an embedded and independent microprocessor that is designed to manage one or more chassis of booting server 300. According to some embodiments, server management device 326 can deploy iSCSI boot parameters from a rack management controller interface, instead of the distributed BMC interfaces.

Figure 4:
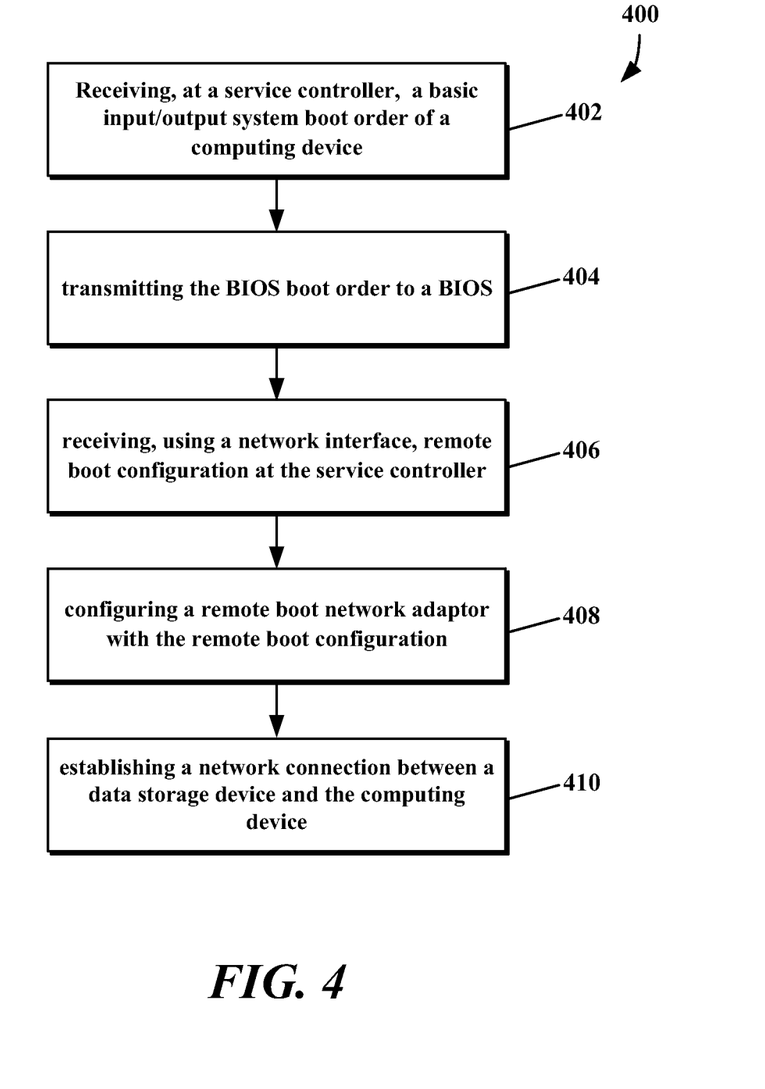
FIG. 4 is an example flow diagram for an iSCSI boot parameter deployment system with static configuration assignment, according to some embodiments.

FIG. 4 is an example flow diagram for an iSCSI boot parameter deployment system with static configuration assignment. It should be understood that there can be additional, fewer, or alternative steps performed in similar or alternative orders, or in parallel, within the scope of the various embodiments unless otherwise stated.

At step 402, a service controller can receive a basic input/output system (BIOS) boot order of a remote computing device. A service controller (e.g., a BMC or a CMC) is an independent and embedded microcontroller that can be responsible for the management and monitoring of the main CPU, firmware and operating system. For example, as shown in FIG. 2, BMC 206 can receive a BIOS boot order from server management device 226 The BIOS boot order can specify from which target device (e.g., iSCSI storage device 216) a client device (e.g., booting server 200) shall be booted.

At step 404, the service controller can transmit the BIOS boot order to a BIOS or a CPU associated with the remote computing device. For example, BMC 206 can transmit the BIOS boot order to BIOS 204 by IPMI over KCS.

At step 406, the service controller can receive, using a network interface such as LAN, remote boot configuration. For example, BMC 206 can receive remote boot configuration (i.e., iSCSI boot configuration) from server management device 226, by a dedicated network interface. The remote boot configuration comprises parameters such as an internet protocol (IP) address of a client device (e.g., booting server 200), a logical unit number of a target device (e.g., iSCSI storage device 216), an IP address of a target device (e.g., iSCSI storage device 216), a target name of the target device (e.g., iSCSI storage device 216), or a password of the target device (e.g., iSCSI storage device 216).

At step 408, the service controller can configure a remote boot network adapter with the remote boot configuration. For example, BMC 206 can transmit the remote boot configuration (i.e., iSCSI boot configuration) to HBA 208. HBA 208 can include, for example, a converged network interface card (CNIC) processor and a read-only memory (ROM). According to some embodiments, HBA 208 can save the remote boot configuration (i.e., iSCSI boot configuration) to memory 212. For example, memory 212 can be a non-volatile memory. memory 212 can be exclusively controlled by BMC 206; memory 212 can be shared by BMC 206 and BIOS 204. Alternatively, BIOS 204 can transmit the iSCSI boot configuration (i.e., iSCSI boot configuration) to HBA 208.

At step 410, the remote boot network adapter can establish a network connection between a data storage device and the remote computing device, wherein the data storage device can comprise an operation system image operable to boot the remote computing device. For example, iSCSI Initiator 202 can use the BIOS boot order and the remote boot configuration (e.g., iSCSI boot configuration) to establish an iSCSI connection between an iSCSI client device and an iSCSI target device, e.g., between booting server 200 and iSCSI storage device 216.

According to some embodiments, an iSCSI connection can include a dedicated iSCSI data transmission link over an IP network. By encapsulating SCSI commands into transmission control protocol/internet protocol (TCP/IP) packets, the iSCSI connection can carry small computer systems interface (SCSI) commands over an IP network. It also support block data transmission using the IP network.

After the iSCSI connection is established, at least a portion of an operation system stored in iSCSI storage device 216 can be loaded into memory 212 of booting server 200. Next, the rest of the operation system image can be sequentially loaded and executed on booting server 200 as if iSCSI storage device 216 is locally attached to the booting server.

With the remote booting completed, booting server 200 can, via the established iSCSI connection, access the boot volume specified by the remote boot parameters. Additionally, booting server 200 can access applications and data from volumes other than the boot volume applications via iSCSI.

Figure 5:
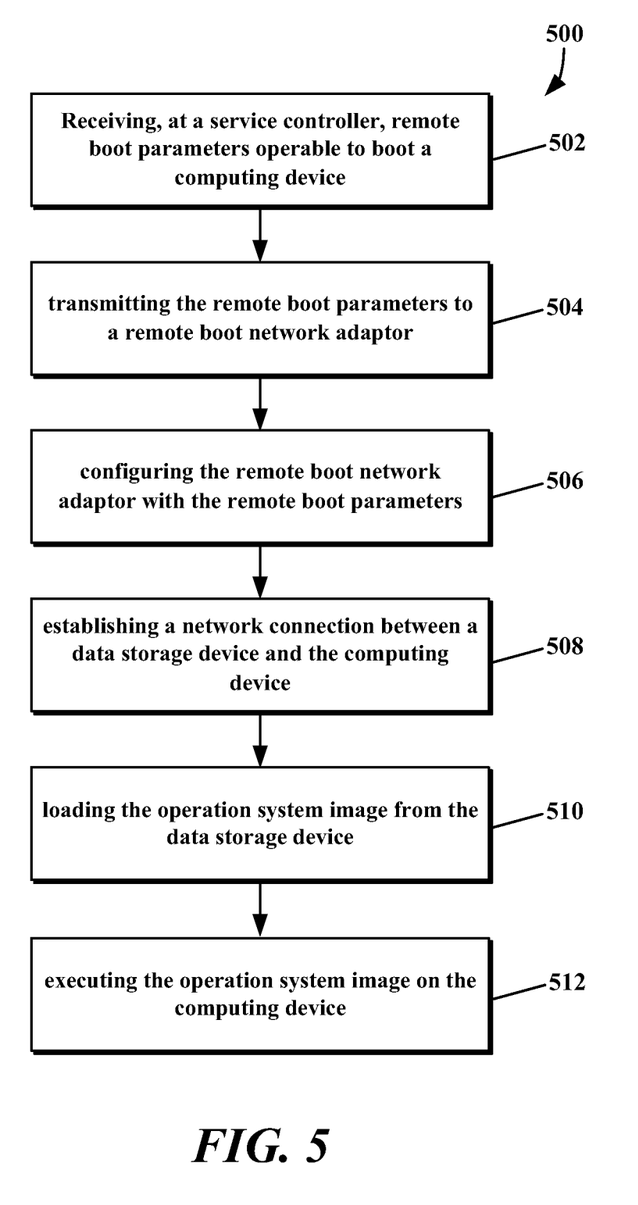
FIG. 5 is another example flow diagram for an iSCSI boot parameter deployment system with dynamic configuration assignment, according to some embodiments.

FIG. 5 is another example flow diagram for an iSCSI boot parameter deployment system with dynamic configuration assignment, according to some embodiments. It should be understood that there can be additional, fewer, or alternative steps performed in similar or alternative orders, or in parallel, within the scope of the various embodiments unless otherwise stated.

At step 502, a service controller can receive remote boot parameters operable to boot the remote computing device from a remote storage device having an operation system image. For example, as shown in FIG. 3, BMC 306 can receive iSCSI boot parameters from server management device 326 or DHCP server 332. The iSCSI boot parameters can include a BIOS boot order, iSCSI boot configuration, or any other information related to iSCSI remote boot. The BIOS boot order can specify from which target device the client device shall be booted. ISCSI boot configuration can include, for example, an iSCSi initiator/target name, an IP address of an iSCSI initiator/target, a logical unit number (LUN) or an identifier of an iSCSI target device, encryption parameters of a target device, or any other booting information that can establish a booting path using the iSCSI protocol. Additionally, the iSCSI boot configuration can further include security parameters such as password, encryption information, or challenge-handshake authentication protocol (CHAP) information.

As illustrated in FIG. 3, dynamic host configuration protocol (DHCP) server 332 is operable to dynamically determine boot parameters related to the iSCSI remote booting process. DHCP server 332, for example, can include iSCSI parameter manager 334 operable to determine, store and transmit the boot parameters. DHCP server 332 can further include a NIC 336 operable to implement a LAN with other network devices. According to some embodiments, in response to requests from booting server 300 for boot parameters via LAN, DHCP server 332 can dynamically determine iSCSI boot configuration for establishing an iSCSI connection between an iSCSI client device and an iSCSI target device.

At step 504, the service controller can transmit, using a system bus, the remote boot parameters to a remote boot network adapter associated with the remote computing device. For example, BMC 306 can transmit the iSCSI boot parameters to HBA 308 by IPMI over KCS.

At step 506, the remote boot network adapter can be configured with the remote boot parameters. For example, BMC 306 can transmit the received iSCSI boot parameters to HBA 308. According to some embodiments, HBA 308 can save the iSCSI boot parameters to memory 312. Alternatively, BIOS 304 can transmit the iSCSI boot configuration to HBA 308.

At step 508, the remote boot network adapter can establish a network connection between a data storage device and the remote computing device. For example, booting server 300 can include iSCSI Initiator 302 operable to communicate with an iSCSI target device such as iSCSI storage device 316. According to some embodiments, iSCSI initiator 302 can use the boot order and the iSCSI boot configuration to establish an iSCSI connection between an iSCSI client device and an iSCSI target device, e.g., between booting server 300 and iSCSI storage device 316.

An iSCSI connection can be, for example, a dedicated iSCSI traffic link over an IP network. The iSCSI connection can carry small computer systems interface (SCSI) commands over an IP network, which can support block data transmission using the IP network.

At step 510, the system can load least a portion of the operation system image from the data storage device to a memory of the remote boot network adapter. For example, after the iSCSI connection is established, at least a portion of an operation system can be loaded into memory 312 of booting server 300. Next, the rest of the operation system can be accordingly loaded and executed on booting server 300 as if iSCSI storage device 316 is locally attached to the booting server.

At step 510, the system can execute the operation system image on the remote computing device. For example, with the remote booting completed, booting server 300 can, via the established iSCSI connection, access the boot volume specified by the remote boot parameters. Additionally, booting server 300 can access applications and data from volumes other than the boot volume applications via iSCSI.

Further, as shown in FIG. 3, more than one iSCSI client device can boot from one single iSCSI target device using the iSCSI remote boot, which can provide a consolidated data storage and increased system performance. For example, booting server 300 and booting server 314 can share the OS image in iSCSI storage device, by having the same target device IP and LUN in its respective boot configuration. Additionally, when booting server 300 fails, an administrator can remotely substitute the failed disk with a functional server, e.g., booting server 314. Accordingly, the substituting booting server 314 can access data and application in iSCSI Storage Device.

Figure 6:
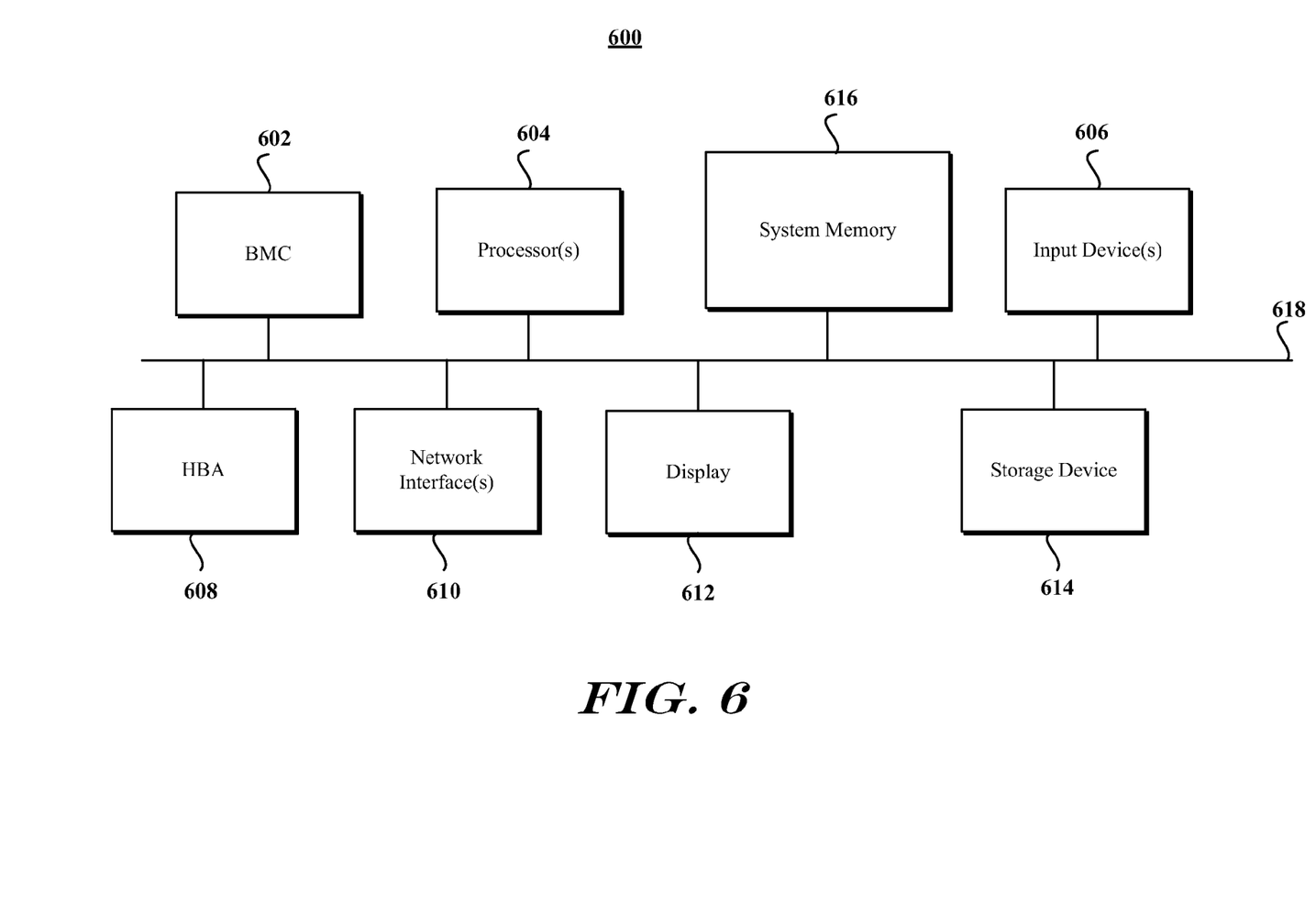
FIG. 6 illustrates a computing platform of a computing device, according to some embodiments.

FIG. 6 illustrates an example system architecture 600 for implementing the systems and processes of FIGS. 1-5. Computing platform 600 includes a bus 624 which interconnects subsystems and devices, such as: BMC 602, processor 604, storage device 614, system memory 616, a network interface(s) 610, and HBA 608. Processor 604 can be implemented with one or more central processing units ("CPUs"), such as those manufactured by Intel® Corporation—or one or more virtual processors—as well as any combination of CPUs and virtual processors. Computing platform 600 exchanges data representing inputs and outputs via input-and-output devices input devices 606 and display 612, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 600 performs specific operations by processor 604, executing one or more sequences of one or more instructions stored in system memory 616. Computing platform 600 can be implemented as a server device or client device in a client-server arrangement, peer-to-peer arrangement, or as any mobile computing device, including smart phones and the like. Such instructions or data may be read into system memory 616 from another computer readable medium, such as storage device 614. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including, but not limited to, non-volatile media and volatile media. Non-volatile media includes, for example, optical or magnetic disks and the like. Volatile media includes dynamic memory, such as system memory 616.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 618 for transmitting a computer data signal.

In the example shown, system memory 616 can include various modules that include executable instructions to implement functionalities described herein. In the example shown, system memory 616 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method, comprising:
receiving, at a baseboard management controller (BMC), a basic input/output system boot order of a remote computing device, wherein the BMC is an independent and embedded microcontroller, the BMC operable to manage and monitor a main central processing unit (CPU), firmware and operating system of the computing device;
providing, via the BMC, the basic input/output system boot order to a basic input/output system of the remote computing device;
receiving, using a network interface, remote boot configuration at the BMC;
configuring a remote boot network adapter of the remote computing device with the remote boot configuration, wherein the remote boot configuration comprises an internet protocol address of the remote computing device;
establishing, using the remote boot network adapter, a network connection between a data storage device and the remote computing device, the data storage device comprising an operation system image operable to boot the remote computing device;
causing at least a portion of the operation system image to be loaded from the data storage device to a memory of the remote boot network adapter using the network connection; and
causing the operation system image to be executed on the remote computing device, wherein the data storage device is operable to execute the operation system image on a second remote computing device to provide consolidated data storage and an increased system performance.

2. The computer-implemented method of claim 1, further comprising:
transmitting a network interface boot configuration to a network interface adapter using one of an inter-integrated circuit system bus or bridged by the basic input/output system.

3. The computer-implemented method of claim 1, wherein the BMC is operable to provide the basic input/output system boot order to the basic input/output system using one of keyboard controller style interface or an in-band interface.

4. The computer-implemented method of claim 1, wherein the remote boot configuration comprises at least one of a logical unit number of the data storage device, an internet protocol address of the data storage device, a target name of the data storage device, or a password of the data storage device.

5. The computer-implemented method of claim 1, wherein the BMC is a rack management controller.

6. The computer-implemented method of claim 1, wherein the boot order and the remote boot configuration are determined by a server management device.

7. The computer-implemented method of claim 1, wherein at least one of the boot order or the remote boot configuration is determined by a dynamic host configuration protocol server.

8. The computer-implemented method of claim 1, wherein the remote boot configuration includes internet small computer system interface boot configuration, and wherein the remote boot network adapter includes a host bus adapter operable to implement a dedicated network for internet small computer system interface data transmission.

9. The computer-implemented method of claim 8, further comprising:
accessing data stored in the data storage device using the internet small computer system interface data transmission.

10. The computer-implemented method of claim 1, wherein at least one of the BMC or the basic input/output system is operable to configure the remote boot network adapter with the remote boot configuration.

11. A system, comprising:
a processor; and
a memory device including instructions that, when executed by the processor, cause the processor to perform operations comprising:
receive, at a baseboard management controller (BMC), remote boot parameters operable to boot a remote computing device from a remote storage device having an operation system image, wherein the BMC is an independent and embedded microcontroller, the BMC operable to manage and monitor a main central processing unit (CPU), firmware and operating system of the remote computing device;
provide the remote boot parameters to a remote boot network adapter of the remote computing device;
configure the remote boot network adapter with the remote boot parameters and an internet protocol address of the remote computing device;
establish, using the remote boot network adapter, a network connection between a data storage device and the remote computing device to perform a boot;
cause at least a portion of the operation system image to be loaded from the data storage device to a memory of the remote boot network adapter using the network connection; and
cause the operation system image to be executed on the remote computing device, wherein the data storage device is operable to execute the operation system image on a second remote computing device to provide consolidated data storage and an increased system performance.

12. The system of claim 11, wherein the remote boot parameters comprises at least one of a basic input/output system boot order of the remote computing device, or remote boot parameters further comprising at least one of a logical unit number of the data storage device, an internet protocol address of the data storage device, a target name of the data storage device, or a password of the data storage device.

13. The system of claim 11, wherein the processor is configure to provide the remote boot parameters to the remote boot network adapter via one of an inter-integrated circuit system bus or bridged by the basic input/output system.

14. The system of claim 11, wherein the remote boot parameters are determined by a server management device.

15. A non-transitory computer-readable storage medium storing instructions which, when executed by a processor, cause the processor to perform operations comprising:
receiving, at a baseboard management controller (BMC), remote boot parameters operable to boot a remote computing device from a remote storage device having an operation system image, wherein the BMC is an independent and embedded microcontroller, the BMC operable to manage and monitor a main central processing unit (CPU), firmware and operating system of the remote computing device;
providing, via the BMC, the remote boot parameters to a remote boot network adapter of the remote computing device;
configuring the remote boot network adapter with the remote boot parameters and an internet protocol address of the remote computing device;
establishing, using the remote boot network adapter, a network connection between a data storage device and the remote computing device to perform a boot, the data storage device comprising an operation system image operable to boot the remote computing device;
causing at least a portion of the operation system image to be loaded from the data storage device to a memory of the remote boot network adapter using the network connection; and
causing the operation system image to be executed on the remote computing device, wherein the data storage device is operable to execute the operation system image on a second remote computing device to provide consolidated data storage and an increased system performance.

16. The non-transitory computer-readable storage medium of claim 15, wherein the remote boot parameters are determined by at least one of a server management device or a dynamic host configuration protocol server.

17. The non-transitory computer-readable storage medium of claim 15, wherein the remote boot parameters include at least one of a basic input/output system boot order or internet protocol boot configuration, and wherein the remote boot network adapter includes a host bus adapter operable to implement a dedicated network for internet protocol data transmission.

18. The non-transitory computer-readable storage medium of claim 15, wherein the remote boot parameters comprise at least one of a basic input/output system boot order of the remote computing device, or remote boot parameters further comprising at least one of a logical unit number of the data storage device, an internet protocol address of the data storage device, a target name of the data storage device, or a password of the data storage device.

19. The non-transitory computer-readable storage medium of claim 15, wherein the service controller is operable to provide the remote boot parameters to the remote boot network adapter via one of an inter-integrated circuit system bus or bridged by the basic input/output system.

20. The computer-implemented method of claim 1, further comprising:
    transmitting a network interface boot configuration to the basic input/output system.

\* \* \* \* \*